(12) United States Patent
Yochim

(10) Patent No.: US 7,248,699 B2
(45) Date of Patent: Jul. 24, 2007

(54) ENCRYPTION METHOD USING SYNCHRONIZED CONTINUOUSLY CALCULATED PSEUDO-RANDOM KEY

(75) Inventor: Blair Yochim, Coquitlam (CA)

(73) Assignee: International Business Machines Corporation, Armonk, NY (US)

( * ) Notice: Subject to any disclaimer, the term of this patent is extended or adjusted under 35 U.S.C. 154(b) by 723 days.

(21) Appl. No.: 10/308,317

(22) Filed: Dec. 3, 2002

(65) Prior Publication Data

US 2003/0115449 A1  Jun. 19, 2003

(30) Foreign Application Priority Data

Dec. 18, 2001  (CA) .................................. 2365481

(51) Int. Cl.
*H04L 9/00* (2006.01)
*H04K 1/00* (2006.01)

(52) U.S. Cl. .................... 380/268; 713/194; 380/46
(58) Field of Classification Search ................ 380/28, 380/42, 255; 713/150; 705/76
See application file for complete search history.

(56) References Cited

U.S. PATENT DOCUMENTS

| | | | | |
|---|---|---|---|---|
| 4,398,062 A * | 8/1983 | McRae et al. | ............. | 380/257 |
| 5,159,633 A * | 10/1992 | Nakamura | ................... | 380/30 |
| 5,335,280 A * | 8/1994 | Vobach | ........................ | 380/42 |
| 5,430,759 A * | 7/1995 | Yokev et al. | ............... | 375/133 |
| 5,440,640 A * | 8/1995 | Anshel et al. | ................ | 380/46 |
| 5,452,357 A | 9/1995 | Naccache | .................... | 380/25 |
| 5,499,266 A * | 3/1996 | Yokev et al. | ............... | 375/136 |
| 5,519,718 A * | 5/1996 | Yokev et al. | ............... | 375/133 |
| 5,533,127 A | 7/1996 | Luther | ......................... | 380/28 |
| 5,546,422 A * | 8/1996 | Yokev et al. | ............... | 375/134 |
| 5,583,517 A * | 12/1996 | Yokev et al. | ............... | 342/457 |
| 6,061,390 A | 5/2000 | Meehan et al. | ............ | 375/208 |
| 6,128,386 A * | 10/2000 | Satterfield | ..................... | 380/28 |
| 6,212,638 B1 * | 4/2001 | Lee et al. | ................... | 713/179 |
| 6,490,354 B2 * | 12/2002 | Venkatesan et al. | .......... | 380/43 |
| 6,820,063 B1 * | 11/2004 | England et al. | ............... | 705/54 |

FOREIGN PATENT DOCUMENTS

WO  WO 95/10148  * 4/1995

* cited by examiner

*Primary Examiner*—Christopher Revak
(74) *Attorney, Agent, or Firm*—Schmeiser, Olsen & Watts; David L. Adour

(57) ABSTRACT

Prior methods of encryption can be broken by sufficiently powerful decryption techniques. The present invention provides a method of making decryption practically extremely difficult. It involves having synchronized processors continuously calculate a defined pseudo-random number and communicate the message by adding it to the sequentially continuously calculated number.

32 Claims, 3 Drawing Sheets

ENCRYPTION METHOD USING SYNCHRONIZED CONTINUOUSLY CALCULATED PSEUDO-RANDOM KEY

TECHNICAL FIELD

The invention relates to the field of encryption methods and more particularly to a method for encrypting electronic communications using an irrational number sequence as a real time number source.

BACKGROUND ART

Methods of encryption are essential for commerce and many other uses to provide secure electronic communications. The history of encryption is an important and fascinating aspect of the history of mankind and even was a driving force for the invention of computers. During World War II, the German armed forces used the famous Enigma Machine, a mechanical substitution encryption device, for secure communications within their army. However, Enigma communications were first broken by Poland and then subsequently, on an ongoing secret basis for over 30 years by the British in their Bletchley Park location, which involved a collection of their top mathematicians including the famous Alan Turing. The Allied D-Day invasion of Normandy only occurred after confirming with secretly decrypted Enigma messages, that the Germans were not aware of the upcoming invasion. Similarly, the Americans, were able to also secretly decrypt secure communications within the Japanese army.

Currently, the most commonly used form of encryption for online communications, public key encryption, is asymmetric encryption. In this form of encryption, a party has a pair of keys. One key is a public key, which can be made freely available to the public. The other key carefully guarded by the party is a private key. A message encoded with the particular public key can only be decoded using the corresponding private key, and vice versa. RSA (Rivest-Shamir-Adleman) is the most commonly used public key algorithm. The mathematical problem of determining the prime composite factors of large numbers (e.g. 100-200 digit numbers) limits decryption by unauthorized parties. The drawback with such methods is that the private keys can be deciphered with sufficient effort (as was done in 1994 by 600 volunteers and their computers), and if an unauthorized party gains knowledge of the private key, then the encrypted messages are readily decrypted.

In symmetric methods of encryption, the sender and the recipient use the same code to encrypt and decrypt the message. For example, the Data Encryption Standard (DES) is a widely used symmetric encryption algorithm which was originally developed by IBM in the mid-1970's. DES is a block cipher with 64 bit block size. It uses 56-bit keys. Many current commerce applications use DES. It can, however, be broken using modem computers and special hardware. Other encryption standards can also be broken by applying a large number of processors since the calculations can be broken down into separate tasks.

The only cipher which cannot possibly be broken or deciphered is the One-Time Pad (OTP), which has been used for secure communication between the heads of the United States and Russia. The first OTP was the Vernam Cipher invented by Gilbert Vernam of AT&T in the United States in 1918. This cipher simply takes a stream of bits that contains the plaintext message, and a secret random bit-stream of the same length as the plaintext (the key). To encrypt the plaintext with the key, each pair of bits from the key and plaintext is sequentially acted on by the exclusive-or function to obtain the ciphertext bit. The ciphertext cannot be deciphered if the key is truly random and the key is kept secret from an unauthorized party. The problem with this method is that the key should be at least the same length as the message. If a shorter key is used and repeated then the cipher can be broken. Consequently the problem of securely communicating the random key for each message is just as problematic as securely communicating the message. If an unauthorized party obtains the key, the message is readily decrypted.

After the Enigma Machine, the Lorenz Company used the Vernam Cipher concept in the early 1940's to create their Lorenz machine for the German armed forces to use for even more secure communications. The Lorenz machine was a mechanical attachment to teleprinters which created pseudo-random sequences. An operational mistake made by a German transmitter operator who reused a pseudo-random key to retransmit a message allowed the British Bletchley Park team to better understand the Lorenz machine. Then using about 1,500 vacuum tubes, the Bletchley Park team created the Colossus system in December 1943 to regularly secretly decrypt Lorenz communications. Many believe Colossus to be the first electronic computer, however even its existence was not made known until many years later. All Colossus machines were subsequently destroyed to maintain their secrecy. The problem with Lorenz was that because of mechanical limitations, only pseudo-random keys could be created, not truly random ones. With today's usage of electronic computers, truly random keys can now be created.

There is a need therefore for purposes of encrypted messages in situations where extreme security is required for a method of encryption where an unauthorized party cannot decrypt messages in a timely way even with knowledge of the decryption algorithm.

SUMMARY OF THE INVENTION

The present invention therefore provides a method of securely communicating a digital message between first and second information processing devices, the method comprising the steps of: i) the first and second information processing devices each sequentially calculating and storing a pre-determined pseudo-random number, wherein such calculations are continuous and synchronized; ii) the first information processing device adding the digital message to the sequentially calculated pre-determined pseudo-random number to form an encrypted message; iii) the first information processing device communicating the encrypted message to the second information processing device; and, iv) the second information processing device subtracting the sequentially calculated pre-determined pseudo-random number from the encrypted message to thereby obtain the digital message. Preferably the pre-determined pseudo-random number is an irrational number such as a square root of a prime number. This invention will be referred to as "SRK" ("Square Root Karrier" with Karrier instead of Carrier). Other functions and their inverse besides addition and subtraction may be used.

The invention further provides through its embodiments a data processing system for carrying out the method, as well as software for implementing the system and carrying out the method of the invention.

BRIEF DESCRIPTION OF DRAWINGS

In drawings which disclose a preferred embodiment of the invention.

BEST MODE(S) FOR CARRYING OUT THE INVENTION

Figure 1:
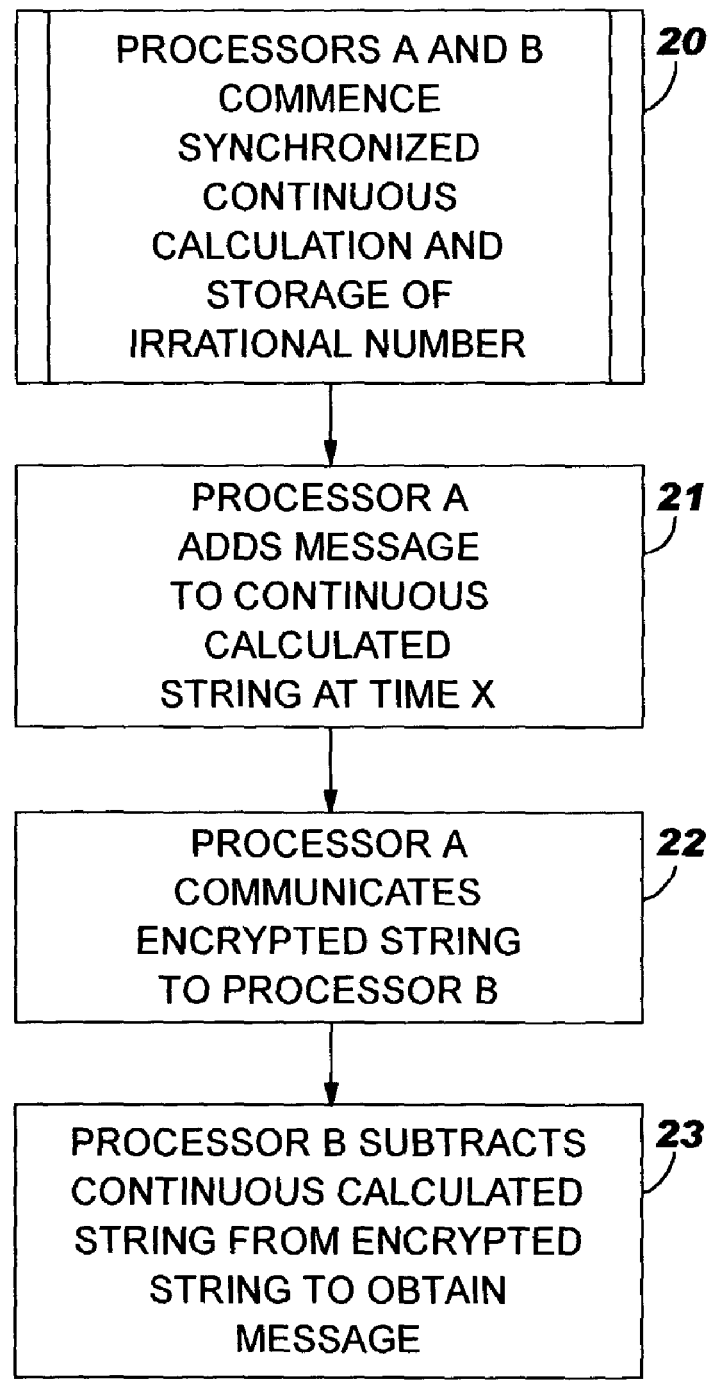
FIG. 1 is a flow chart illustrating the method of the invention

Referring to FIG. 1 which depicts the general nature of the method of the invention, it may be observed that in order to send an encrypted message from processor A to processor B, the two processors commence synchronized continuous calculation and storage of a pseudo-random or irrational number string, 20.

The message to be sent by processor A is added, 21, to the continuous calculated string, to form an encrypted message string which is sent to processor B, 22. Processor B subtracts its continuous calculated string from the encrypted message string to decipher the message, 23.

Figure 2:
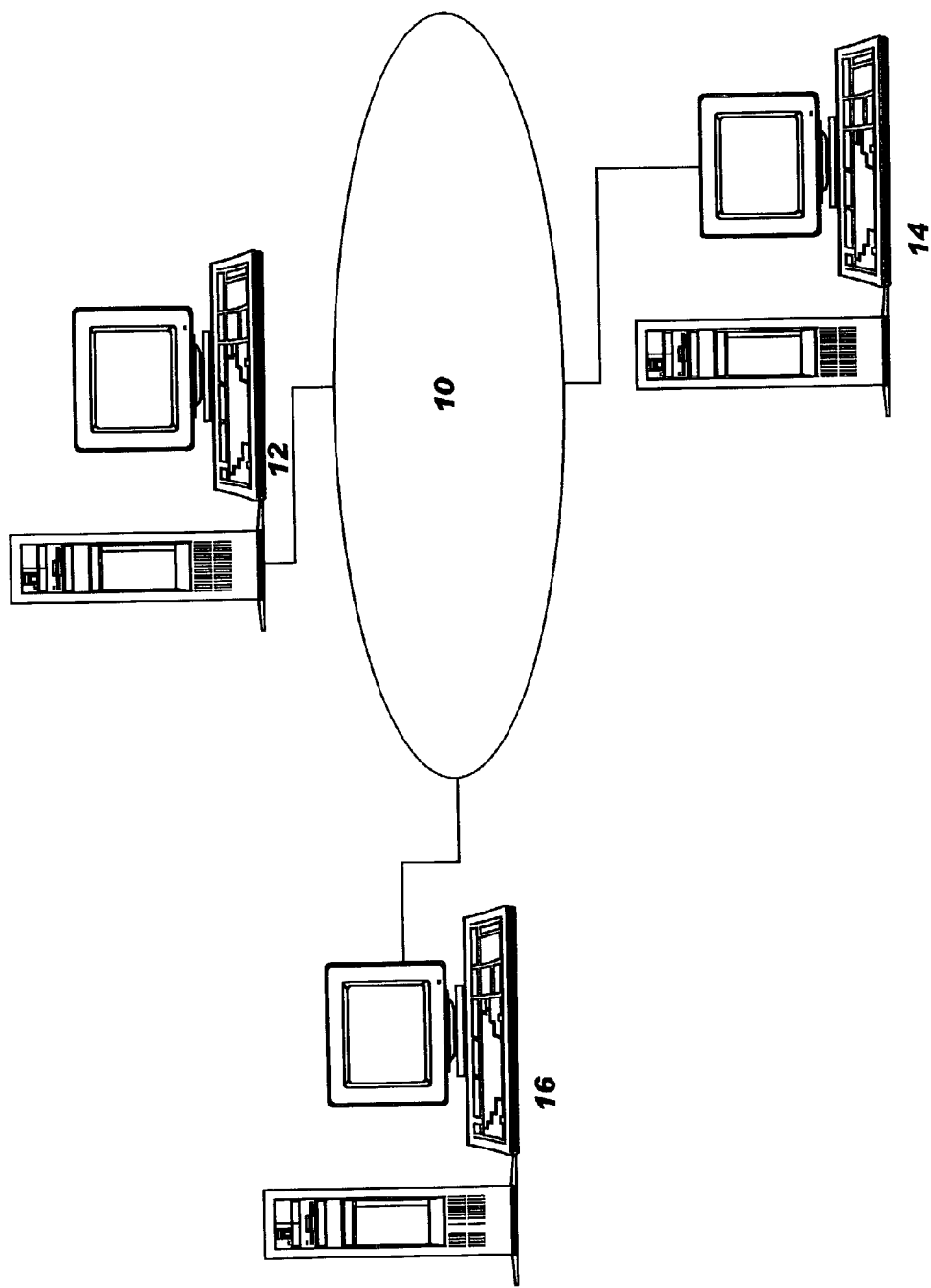
FIG. 2 is a schematic illustration of a computer network according to the present invention.

Referring to FIG. 2, a secure computer network is designated generally as 10. A plurality of two or more special processors 12, 14, 16 are provided at sites in the secure network 10. While in the preferred embodiment such network is a token ring network it will be apparent to those skilled in the art that the present invention also has application to any communications network, including any local or wide area network or "intranet" incorporating one or more clients and one or more servers. The present method may also be applied to spread-spectrum radio communications as the transmission medium. The preferred system however is a network similar to or the equivalent of Token Ring. Any of the processors 12, 14, 16 can originate a message using a token concept to originate transmission of a message through the other sites.

The preferred architecture of the processors 12, 14, 16 is designed to make such processors as fast and powerful as economically possible. The software or firmware algorithms described in further detail below and which are executed by the processors are designed to be as optimized as possible. For example, the processors may be provided with the fastest possible application-specific CPU's, with other Application Specific Integrated Circuits (ASIC's). They may have a high quantity of high-speed cache error-correcting RAM. They may have highly accurate system clocks to maintain synchronization when offline from the network 10. Preferably they are highly reliable with full redundancy of all processors hardware including power supplies and are backed up with Uninterruptible Power Supplies (UPS) battery power supplies. They will preferably be regularly updated with the latest and fastest technologies while the system is live. The need for highest possible speed is to make it prohibitive for others to attempt unauthorized decryption by duplicating or improving the technology and catching up with the real-time calculation of the irrational number digits.

One method of maximizing the security of the system by avoiding duplication of the processors by unauthorized parties is to carefully control the processor manufacturing. One location may be made responsible for the manufacturing of the processors 12, 14, 16 so that when a new site is to be added to the network, a new complete processor will be copied at the manufacturing location and will be kept operational with off-line synchronized calculations during transportation to the new network site where it is then put online with other sites in the network. Then all of the digits of the irrational number calculated up to that point in time will exist at the new site.

According to the present method, each processor 12, 14, 16 is synchronized with all other processors by using a self-generated infinite sequence of pseudo-random "carrier" digits. This is the encryption key, which is a string of bits referred to hereafter as the "carrier digits". The carrier digits are the digits of an irrational number (a number which cannot be represented as a fraction of two integers, therefore it is of infinite length) which requires all previous digits to be known in order to calculate the future digits and maintain synchronization with the other sites. Special high speed hardware and algorithms are used to ensure that unauthorized parties cannot keep up with calculating the carrier digits.

Desired messages are encrypted by being added to the carrier digits. Each site decrypts the message by subtracting the carrier digits from the received transmission to obtain the original intended message. Stored documents can be encrypted by the same technique by adding an unencrypted time stamp to the beginning of the document to identify when in the sequence of carrier digits the encryption began.

Figure 3:
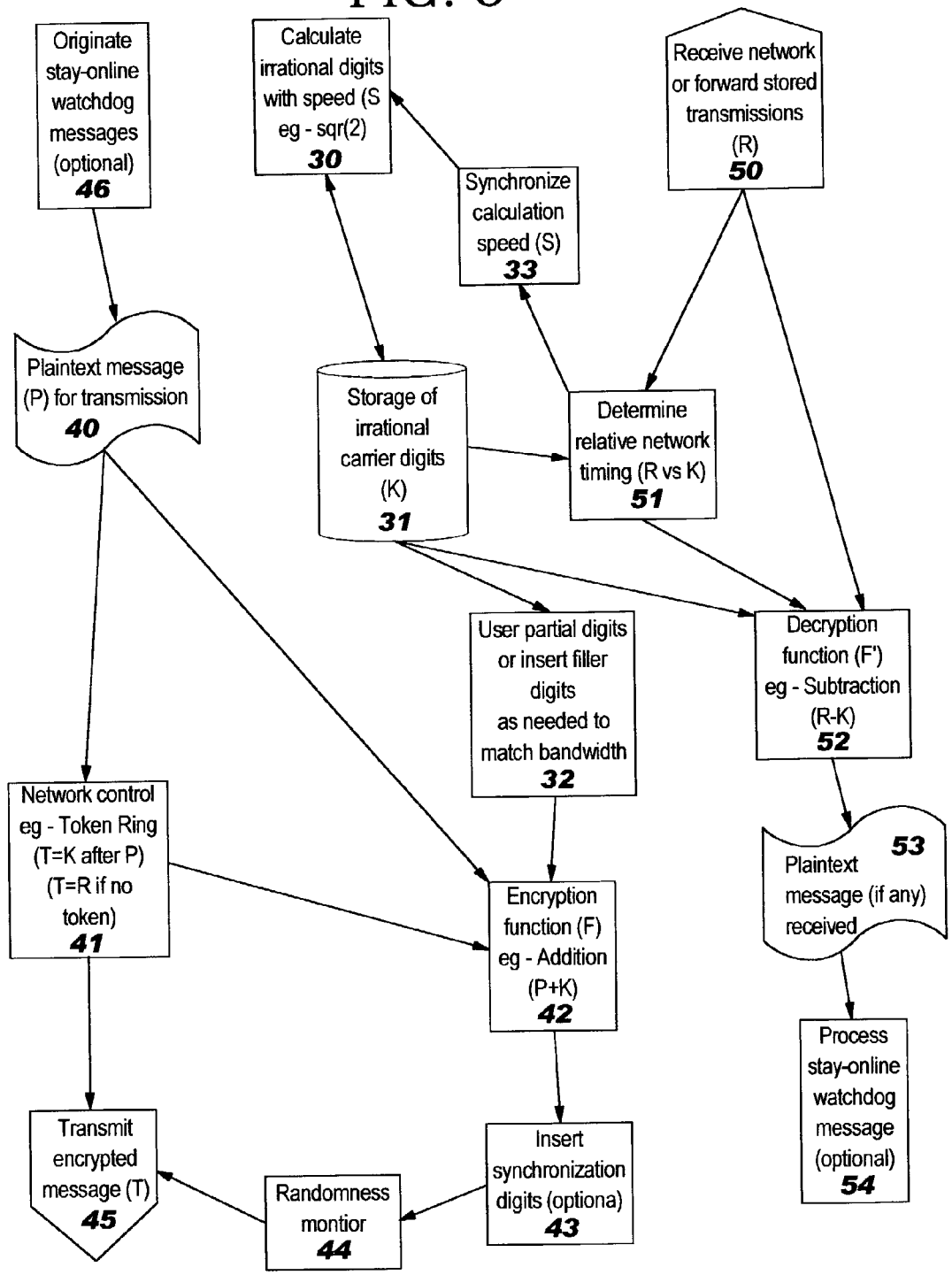
FIG. 3 is a detailed flow chart of an embodiment of the invention.

FIG. 3 describes the operation of an embodiment the invention. The embodiment is discussed below.

Functions 30-33 Calculation of Irrational Carrier Digits

30 This function calculates the digits of the irrational number K with a very high speed S. The calculations maybe performed with a combination of hardware and software depending upon which combination of technologies at the time gives the highest frequency of digits K.

31 The digits of the irrational number K that were calculated by 30 are stored in this database 31. All digits of this database are used to calculate all future digits of K. The implementation of this database is done with fast storage and is redundant to ensure correct storage.

32 Because the irrational number K increases in size with time and all digits are used to calculate future digits, the frequency of the number of digits calculated by 30 naturally decreases with time. However, the transmission bandwidth of the network is a constant, so a compensation must occur between the calculated carrier digits K and the given bandwidth. It is expected that near the beginning of the calculations, the frequency of carrier digits is perhaps higher than the given bandwidth, but as time goes on the frequency of the carrier digits is less than the given bandwidth. Function 32 compensates to a varying degree by either dropping digits or adding other pseudo-random digits calculated by another means using the K digits as the seed.

33 The calculation speed S must be varied to synchronize with all other sites in the network, otherwise if one site's speed S is slightly greater than the others, then in the long term that site's digits K will be in advance of the other sites and decryption will not occur properly. Function 33 uses the timing determined by function 51 to modify the calculation speed S of function 30. The calculation speed S may be varied by either adjusting the hardware clock of 30 or by software means by varying a number of idle states inserted in the algorithm of 30. The variation of S is expected to be minimal. If the network communications has been temporarily halted, then the calculations in 30 and the storage in 31 will continue without modification of S by 33, until the network communications has been reinitiated.

Functions 40-46 Encryption and Transmission

40 A plaintext message P is provided for encryption and subsequent transmission to other site(s) in the network. The message P can be converted to electronic digits using some protocol such as ASCII.

41 A controlling function 41 is used to control the timing of transmissions to the network, since only one site can transmit at a time. Token Ring can be used as the transmission protocol. Normally, if no message P is awaiting transmission, then 41 will ensure that the received network data R obtained by 50 will be simply retransmitted as T by 45. When 40 indicates to 41 that a message P is waiting to be transferred, then 41 will wait until it has permission to transmit. When permission is granted, then 41 will initiate the encryption of P in 42. After P has been encrypted by 42 and fully transmitted by 45, then 41 will keep transmitting unencrypted digits of K through 42-45.

42 The function 42 will use the encryption key digits (modified K) provided by 32 and the plaintext message P as inputs to the encryption function F and provide the encrypted data to 43. The encryption function F could be as simple as an addition function of the digits of P and the modified digits of K, or any more complicated function.

43 Optionally, additional digits may be specially inserted by 43 in the transmission stream to help the receiving sites more easily perform the synchronization task of 51. This may be required depending upon many technical implementation details.

44 This safety function determines if the digits to be transmitted T are still safely random enough so that the encrypted message P is still secure. Randomness tests could be done on the digits of T, and another test could be done to ensure the unencrypted digits of P are not appearing in T. If T is not sufficiently random, then transmission will be prevented.

46 Special optional messages can be transmitted from a centrally known-secured site to each of the other sites to keep the other sites online. These messages can be sent automatically by 46 as messages P to 40. Each site will receive such messages in function 54 and if not regularly received, then a site will self-destruct its database 31 of digits K. Likewise, if a site has been known to have been compromised somehow or is in the hands of an unauthorized party, then 46 can send a special message to another site's 54 to tell that site to self-destruct.

Functions 50-54 Reception and Decryption

50 The network data R containing encrypted messages is received by 50 of each site. An additional feature can also be provided. Stored encrypted messages can be unencrypted at anytime in the future. Such stored messages can be provided by 50 with a timestamp as to when they were received. The timestamp will be used by 51 to help determine which digits of K will be used to decrypt the stored message.

51 The timing of the received R is determined in comparison with the digits of K in 31 by function 51. If special synchronization digits were inserted by 43, then these digits will be found by 51. The partial digits and/or filler digits in R that were deleted or inserted by 32 also need to be taken into account to determine the synchronization. This is able to done by each site because 32 will be performed in equivalent fashion at each site at a given time. The resulting timing determined by 51 is provided to 52.

52 The decryption of R from 50 is done by 52 using the relative timing provided by 51 to the digits of K in 31. The decryption function F' is mathematically opposite of the encryption function F done in 42.

53 Function 52 provides the decrypted plaintext message 53 which will be equivalent to the transmitted message P originated in 40 of the transmitting site. If there has not been a transmitted message P, then the plaintext message of 53 will be null or blank.

54 To ensure that a site has not been compromised, optional process 54 will receive and process stay-online watchdog messages sent by a master central site's 46. If such a message has not been received within a given time, then 54 will destroy the data in 31 to ensure the site's system cannot be used by an unauthorized party.

Encryption Algorithm

The invention uses a mathematical function which generates an irrational number for the carrier digits. For example a square root function of prime numbers (e.g. square root of 2), pi or e can be used. Although such irrational numbers are not considered to be truly mathematically random, the individual digits of such an irrational number are essentially in a non-repeating random sequence, usually unpredictable unless specifically calculated. However such numbers are not in fact random and can be precisely calculated.

It apparently is not feasible to parse the irrational number calculations among many processors at multiple locations, as has been done to break other encryption schemes.

Taking the example of the square root of 2, the infinite sequence of digits 1.4142135623 . . . is transmitted between processors 12, 14, 16. When a message is to be transmitted, then the equivalent digits of the message will be added to the carrier digits which would have been transmitted. For example if the carrier digits 213562 would be transmitted and the message is _439_, then the actual transmission would be 217852. Note that the overflow carry's are dropped by using modulus 10 arithmetic. The receiving site takes the carrier digits 213562 that it also calculated and subtracts them from the received digits 217852 to obtain the original message _439_.

The digits of the square root of 2 are known to be statistically non-biased in the long term over any of the possible 10 decimal digits. Adding normal messages to such a number will not change this randomness characteristic. The square root of 2 is a good number to use because such a number has been studied for hundreds of years by hundreds of mathematicians. There is no known method to calculate future decimal digits of the square root of 2 without calculating all previous digits. This obstacle prevents unauthorized parties from calculating future carrier digits without calculating all past digits.

In order to maintain synchronization with the other processors 12, 14, 16, each site compares in real-time its calculated digits with the received digits in order to self-adjust its calculations speed in a phase-locked loop fashion. Certain synchronizing digits without layered message data can be regularly sent to assist with ensuring synchronization. If the network connection is lost for any reason, then each site must continue to generate the carrier digits and then will automatically resynchronize with the other sites when the network is back on-line.

It is recommended that the Token Ring transmissions always be originated by one of the network sites which all other sites will simply receive and forward on. If a particular site is transmitting its encrypted message, then each of the other sites will simply forward this message onto the next site. During idle times when there are no sites transmitting an encrypted message, then the last site to transmit will continue the transmission of the irrational number carrier digits which all other sites will simply forward on. The reason for this is to ensure that an unauthorized party cannot otherwise determine the original message by listening into the network at different locations. This problem would occur if one site is sending the encrypted message while another site is simultaneously transmitting the unencrypted carrier digits at the same time.

To enhance the security of the system, another pseudo-random finite series of digits could be added to the calculations which will help to make determining the algorithm even more difficult. If this is done, each site will have to synchronize its calculation of this pseudo-random finite series of digits.

If the number of past digits becomes too great a quantity to make timely calculations or becomes too expensive in hardware costs to maintain such a large number of digits, then the calculations may be modified to include only the last N digits or perhaps retain only every M digits. Instead of an infinite irrational number it may be satisfactory to instead use a lengthy pseudo-random finite digits calculation for the carrier digits. Alternatively, the algorithm can periodically self-modify. Careful mathematical investigation would be needed when considering the risks of a given compromised algorithm.

For further security, a separate process will monitor the digits transmitted to ensure their pseudo-randomness is maintained. This will help to protect against an unforeseen future algorithm problem. If this monitoring process determines that the digits are no longer within an acceptable statistical range, then the transmission can be halted until the problem is solved.

If the frequency of digits calculated is too great to transfer over a limited bandwidth communication link, then every second, third or other interval of digits will be used for communications and the others will be used for future calculations. This will not compromise the randomness of the carrier digits used. Alternatively, if the carrier digits cannot keep up with the transmission bandwidth, then it will be necessary to insert additional pseudo-random digits calculated from another technique between the carrier digits.

If multiple networks 10 are needed (e.g. multiple customers) then each network can use different irrational carrier numbers such as the square roots of 2, 3, 5, 7 and other prime numbers.

Preferably the implementation of this method is done initially in secrecy without public transmissions so that the calculations of the chosen irrational number will have proceeded to a point where, once an unauthorized party has learned of the method, reverse calculation by an unauthorized party will be prohibitively difficult.

Other existing standard encryption methods can be used in conjunction with the present method by encrypting the original data with the other method, and then applying the present method to the encrypted data.

As an additional security measure, special messages can be regularly sent to each of the sites on the carrier digits from a guaranteed secured central site to occasionally give each site a stay-online watchdog command. With this feature, if a particular site is known to have been compromised, then the central site will not give the site-specific stay-online command and instead can give the compromised site a command to shut down in case it is still operational. A site that does not regularly get a stay online command in a live network will self-destruct by simply deleting its past calculated data. Once a site deletes its data, it can never catch up with the rest of the synchronized network by regenerating the history of carrier digits.

Thus, in the present invention only one key is used, and knowledge of the key can be made public without concern that unauthorized parties can decrypt the messages in a reasonable time. This is because the digit calculation in respect of the present invention cannot be broken down into tasks to be handled by separate processors. While the length of keys used in other techniques is typically on the order of magnitude of 100 to 200 digits, the length of the key in the present technique is much larger and increases in size as time passes, theoretically being of infinite length after infinite time. Because data is transferred continuously over the communication link in the present invention, and appears to be completely random regardless of when a message is transmitted, there is no indication of when a message is being sent, which makes it more difficult for an unauthorized party to decrypt it.

Even if unauthorized parties know the mathematical function of the carrier digits, the encryption key, they will need to have the ongoing technical capability to keep up with the invention's processors in real time. Any delay will prevent ongoing decryption in real time. Whereas in other methods such as DES a single bit error will affect more than one bit, in the present method, single-bit errors can occur without degrading the decryption more than a single-bit error. Consequently error correction can be easily applied. Each site 12, 14 can easily and immediately determine if the communication link has been compromised by a data path intrusion or substitution. The actual encrypting and decrypting is done very quickly due to the simplicity of that part of the algorithm.

Thus, even if others have an exact duplicate of the hardware and software used for each encryption processor, such possession will be useless without capturing the complete real-time copy of all the past calculated carrier digits used to calculate ongoing future digits. If other parties do not possess the capability of calculating carrier digits faster than the system's processors 12, 14, 16, then those other parties will not be able to catch up with the carrier digits of the synchronized network.

A potential limitation of this encryption scheme is that it maybe feasible for an unauthorized party to duplicate the system sometime in the future with at least some of the past calculated irrational number digits. Even if this is done, the current real-time digits will not however be known. So the unauthorized party may be able to decode past messages, not current ones. If this potential limitation is accepted, then this encryption scheme may be best considered to be useful for time-stamped, time-sensitive applications which must be absolutely secure and are not affected if broken in the future. Applications for the invention are government communications, and high value commerce transactions.

With this encryption scheme, an additional advantage is that a Digital Signature is effectively provided, securing the identities of parties using the system, since only such parties will be able to encrypt and decrypt messages. This is useful in government communications and commerce transactions applications.

As will be apparent to those skilled in the art in the light of the foregoing disclosure, many alterations and modifications are possible in the practice of this invention without departing from the spirit or scope thereof. While the mathematical function of addition, and its inverse, subtraction has been described to modify the calculated irrational number by the encrypted message, to further enhance security, another more complicated appropriate mathematical function and its inverse could be used with the calculated irrational number digits and the plaintext, instead of the addition/subtraction function. For example, multiplication, division, other logical operations or even another existing encryption scheme such as DES could be used with sets of the irrational number digits as DES encryption keys. Accordingly, the scope of the invention is to be construed in accordance with the substance defined by the following claims.

The present invention may be embodied in other specific forms without departing from the spirit or essential characteristics thereof. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

The embodiments of the invention in which an exclusive property or privilege is claimed are defined as follows.

I claim:

1. A method of securely communicating a digital message from a first processing device to a second processing device in accordance with a pseudo-random number whose digits are generated continuously and sequentially in real time by the second processing device such that the number of digits in the pseudo-random number generated by the second processing device increases with time, said method comprising:
   generating continuously and sequentially in real time, by the first processing device, the digits of the pseudo-random number such that the number of digits in the pseudo-random number generated by the first processing device increases with time, said generating the digits of the pseudo-random number by the first processing device being synchronized with said generation of the digits of the pseudo-random number by the second processing device;
   generating, by the first processing device, an encrypted message by calculating a function of the digital message and the sequentially generated digits of the pseudo-random number, said calculated function being the encrypted message; and
   communicating, by the first processing device, the encrypted message to the second processing device, said encrypted message adapted to be decrypted by the second processing device to extract the digital message by calculation of the inverse of said function.

2. The method of claim 1, wherein the method comprises, after the first digit of the pseudo-random number has been generated by the first processing device:
   continuously adding, by the first processing device, another digit to the currently existing sequence of digits in the pseudo-random number generated by the first processing device, through use of a first generating means that generates the another digit by utilizing the currently existing sequence of digits in the pseudo-random number.

3. The method of claim 2, wherein the frequency of the number of digits in the pseudo-random number generated by the first processing device decreases with time while the pseudo-random number is being continuously generated by the first processing device.

4. The method of claim 3, wherein said communicating the encrypted message has an associated communication bandwidth, wherein said frequency exceeds said bandwidth when said communicating begins, and wherein there exists an elapse of time after said communicating begins such that said frequency is less than said bandwidth after said elapse of time.

5. The method of claim 4, wherein the method further comprises compensating, by the first processing device, for said frequency exceeding said bandwidth by dropping digits from the pseudo-random number.

6. The method of claim 4, wherein the method further comprises compensating, by the first processing device, for said frequency being less than said bandwidth by adding extra digits to the currently existing sequence of digits in the pseudo-random number, wherein said adding extra digits comprises generating said extra digits through use of a second generating means that generates the extra digits by utilizing the currently existing sequence of digits in the pseudo-random number as a seed, and wherein the second generating means differs from the first generating means.

7. The method of claim 1, wherein the method further comprises adding, by the first processing device, an unencrypted timestamp to the beginning of the encrypted message, and wherein the unencrypted timestamp indicates the time of initiation of said calculating the function of the digital message and the sequentially generated digits of the pseudo-random number.

8. The method of claim 1, wherein the method further comprises varying the calculational speed of the first processing device to implement said generating the digits of the pseudo-random number by the first processing device being synchronized with said generation of the digits of the pseudo-random number by the second processing device.

9. The method of claim 8, wherein said varying the calculational speed of the first processing device comprises adjusting a hardware clock of the first processing device.

10. The method of claim 8, wherein said generating the digits of the pseudo-random number by the first processing device is performed in accordance with an algorithm, and wherein said varying the calculational speed of the first processing device comprises varying a number of idle states inserted in the algorithm.

11. The method of claim 1, wherein said function comprises an addition of the digital message to the sequentially generated digits of the pseudo-random number generated by the first processing device.

12. The method of claim 1, wherein the pseudo-random number continuously generated by the first processing device is an irrational number.

13. The method of claim 12, wherein the irrational number is a prime number.

14. The method of claim 13, wherein the prime number is 2.

15. A computer readable storage medium comprising computer program code therein, said computer code adapted to perform the method of claim 1 when the computer code program is run on the first processing device.

16. A data processing system comprising a data processing device and a computer readable storage medium, said computer readable storage medium having computer program code therein, said computer program code adapted to perform the method of claim 1 when the computer program code is run on the data processing device, said data processing device being the first processing device.

17. A method of securely receiving a digital message from a first processing device by a second processing device in accordance with a pseudo-random number whose digits are generated continuously and sequentially in real time by the first processing device such that the number of digits in the pseudo-random number generated by the first processing device increases with time, said method comprising:

generating continuously and sequentially in real time, by the second processing device, the digits of the pseudo-random number such that the number of digits in the pseudo-random number generated by the second processing device increases with time, said generating the digits of the pseudo-random number by the second processing device being synchronized with said generation of the digits of the pseudo-random number by the first processing device;

receiving, by the second processing device an encrypted message that had been generated by the first processing device, said encrypted message being a function of the digital message and the sequentially digits of the pseudo-random number generated by the first processing device; and decrypting, by the first processing device, the encrypted message to extract the digital message, said decrypting comprising calculating the inverse of said function.

18. The method of claim 17, wherein the method comprises, after the first digit of the pseudo-random number has been generated by the second processing device:

continuously adding, by the second processing device, another digit to the currently existing sequence of digits in the pseudo-random number generated by the second processing device, through use of a first generating means that generates the another digit by utilizing the currently existing sequence of digits in the pseudo-random number.

19. The method of claim 18, wherein the frequency of the number of digits in the pseudo-random number generated by the second processing device decreases with time while the pseudo-random number is being continuously generated by the second processing device.

20. The method of claim 19, wherein said encrypted message is received by the second processing device in accordance with a communication bandwidth, wherein said frequency exceeds said bandwidth when said receiving begins, and wherein there exists an elapse of time after said receiving begins such that said frequency is less than said bandwidth after said elapse of time.

21. The method of claim 20, wherein the method further comprises compensating, by the second processing device, for said frequency exceeding said bandwidth by dropping digits from the pseudo-random number.

22. The method of claim 20, wherein the method further comprises compensating, by the second processing device, for said frequency being less than said bandwidth by adding extra digits to the currently existing sequence of digits in the pseudo-random number, wherein said adding extra digits comprises generating said extra digits through use of a second generating means that generates the extra digits by utilizing the currently existing sequence of digits in the pseudo-random number as a seed, and wherein the second generating means differs from the first generating means.

23. The method of claim 17, wherein an unencrypted timestamp is disposed at the beginning of the encrypted message, and wherein the unencrypted timestamp indicates the time that the first processing device initiated generation of the encrypted message.

24. The method of claim 17, wherein the method further comprises varying the calculational speed of the second processing device to implement said generating the digits of the pseudo-random number by the second processing device being synchronized with said generation of the digits of the pseudo-random number by the first processing device.

25. The method of claim 24, wherein said varying the calculational speed of the second processing device comprises adjusting a hardware clock of the second processing device.

26. The method of claim 24, wherein said generating the digits of the pseudo-random number by the second processing device is performed in accordance with an algorithm, and wherein said varying the calculational speed of the second processing device comprises varying a number of idle states inserted in the algorithm.

27. The method of claim 17, wherein said function comprises an addition of the digital message to the sequentially generated digits of the pseudo-random number generated by the first processing device.

28. The method of claim 17, wherein the pseudo-random number continuously generated by the second processing device is an irrational number.

29. The method of claim 28, wherein the irrational number is a prime number.

30. The method of claim 29, wherein the prime number is 2.

31. A computer readable storage medium comprising computer program code therein, said computer code adapted to perform the method of claim 17 when the computer code program is run on the second processing device.

32. A data processing system comprising a data processing device and a computer readable storage medium, said computer readable storage medium having computer program code therein, said computer program code adapted to perform the method of claim 17 when the computer program code is run on the data processing device, said data processing device being the second processing device.

* * * * *